United States Patent
Jin

(10) Patent No.: US 7,970,207 B2
(45) Date of Patent: Jun. 28, 2011

(54) APPARATUS AND PROGRAM FOR EVALUATING IMAGES

(75) Inventor: Haomin Jin, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 950 days.

(21) Appl. No.: 11/902,344

(22) Filed: Sep. 20, 2007

(65) Prior Publication Data

US 2008/0075366 A1 Mar. 27, 2008

(30) Foreign Application Priority Data

Sep. 22, 2006 (JP) .................................. 2006-256800

(51) Int. Cl.
*G06K 9/00* (2006.01)
*G06K 9/34* (2006.01)

(52) U.S. Cl. ......... 382/165; 382/162; 382/164; 382/173
(58) Field of Classification Search ........................ None
See application file for complete search history.

(56) References Cited

U.S. PATENT DOCUMENTS

| | | | | |
|---|---|---|---|---|
| 4,654,583 | A * | 3/1987 | Ninomiya et al. | 382/147 |
| 5,887,082 | A * | 3/1999 | Mitsunaga et al. | 382/199 |
| 6,021,221 | A * | 2/2000 | Takaha | 382/199 |
| 6,999,623 | B1 * | 2/2006 | Yamaoka et al. | 382/209 |
| 7,372,550 | B2 * | 5/2008 | Goris et al. | 356/4.03 |
| 2003/0193582 | A1 * | 10/2003 | Kinjo | 348/231.99 |
| 2006/0120686 | A1 * | 6/2006 | Liebenow | 386/40 |
| 2006/0126093 | A1 * | 6/2006 | Fedorovskaya et al. | 358/1.14 |
| 2007/0041640 | A1 * | 2/2007 | Tabata et al. | 382/173 |
| 2007/0070409 | A1 * | 3/2007 | Nakagawa et al. | 358/1.15 |
| 2007/0121094 | A1 * | 5/2007 | Gallagher et al. | 356/4.03 |
| 2008/0037828 | A1 * | 2/2008 | Fujita | 382/104 |

FOREIGN PATENT DOCUMENTS

| | | |
|---|---|---|
| JP | 2001-57630 A | 2/2001 |
| JP | 2002-236929 A | 8/2002 |

OTHER PUBLICATIONS

Yu Han; Haomin Jin; Sakauchi, M.; "Construction of multimedia map database using urban city images", IEEE International Conference on Multimedia and Expo, 2001. ICME 2001. pp. 1147-1150.*
Jin, H.; Sakauchi, M.; "Content-based objects detection for the recognition of building images", 2001 International Conference on Image Processing, vol. 2, pp. 705-708.*
Xu Jie; Shi Peng-fei, "Natural color image segmentation", International Conference on Image Processing, 2003. pp. 973-976, vol. 1.*

* cited by examiner

*Primary Examiner* — Samir A Ahmed
*Assistant Examiner* — Li Liu
(74) *Attorney, Agent, or Firm* — Birch, Stewart, Kolasch & Birch, LLP

(57) ABSTRACT

An image evaluating apparatus capable of evaluating photographic images with expressions that approach human perception is provided. Boundaries among subjects are extracted from a digital photographic image in which a plurality of subjects are pictured. Image regions, which are divided by the boundaries, are extracted from the image. The position of each region is judged by determining which of a plurality of sections each image region is included in. The features of subjects pictured within each image region are judged. Then, the digital photographic image is evaluated based on the extracted boundaries, the sections in which each image region is included, and the features of the subjects pictured within each image region.

6 Claims, 5 Drawing Sheets

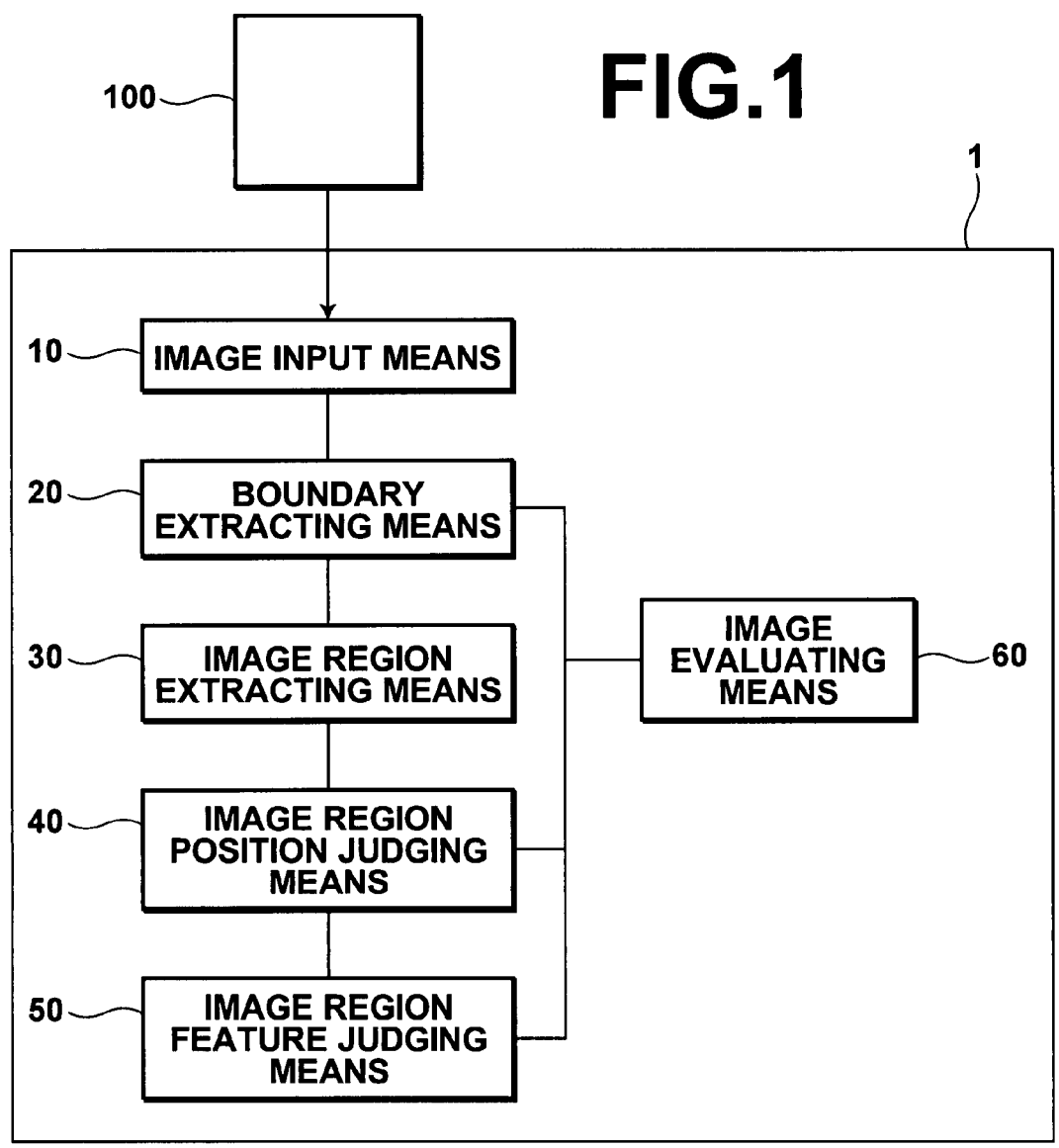

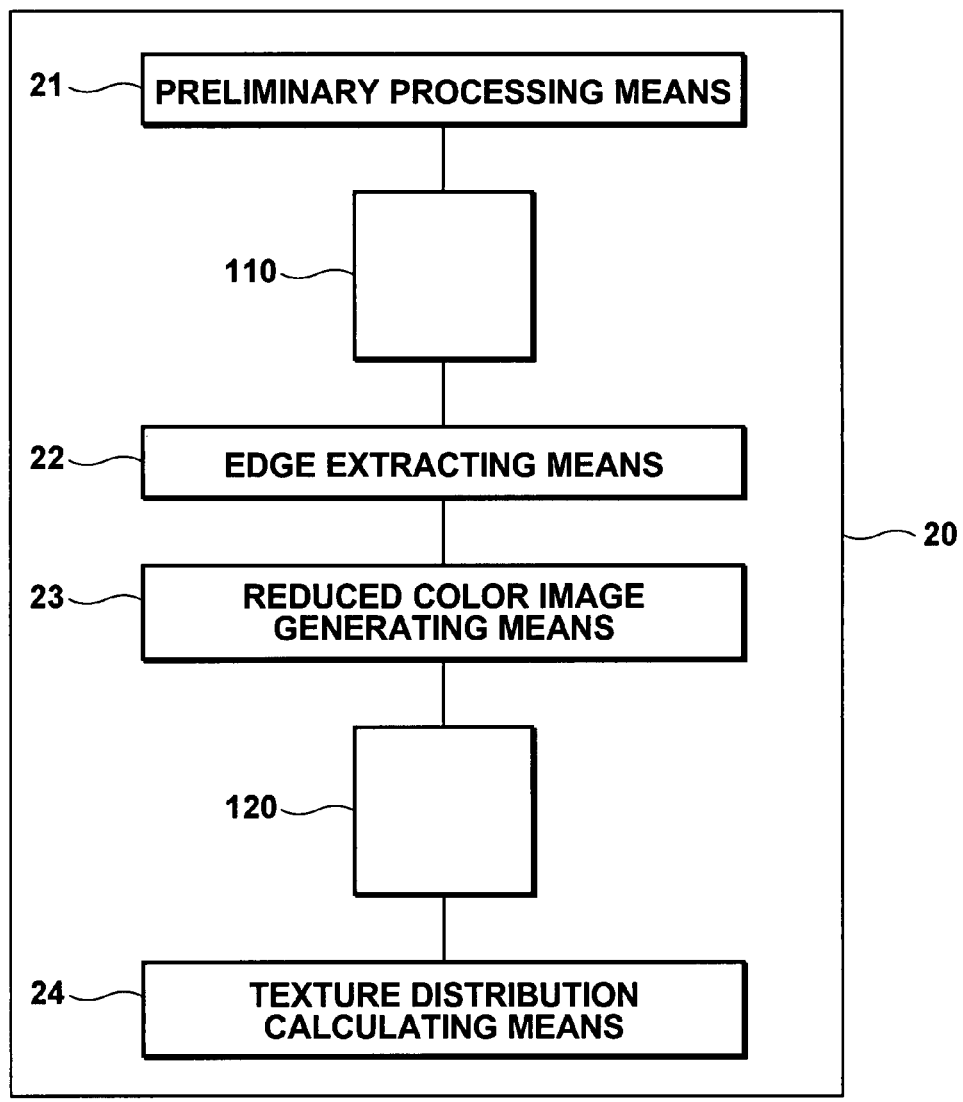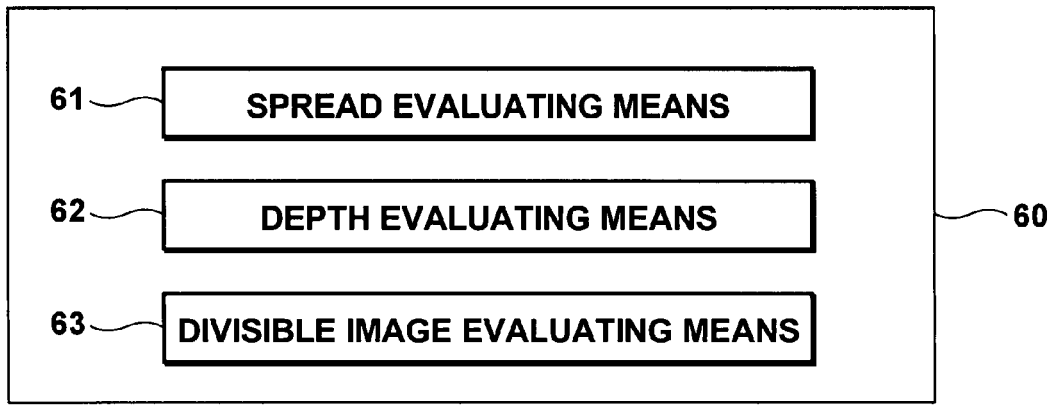

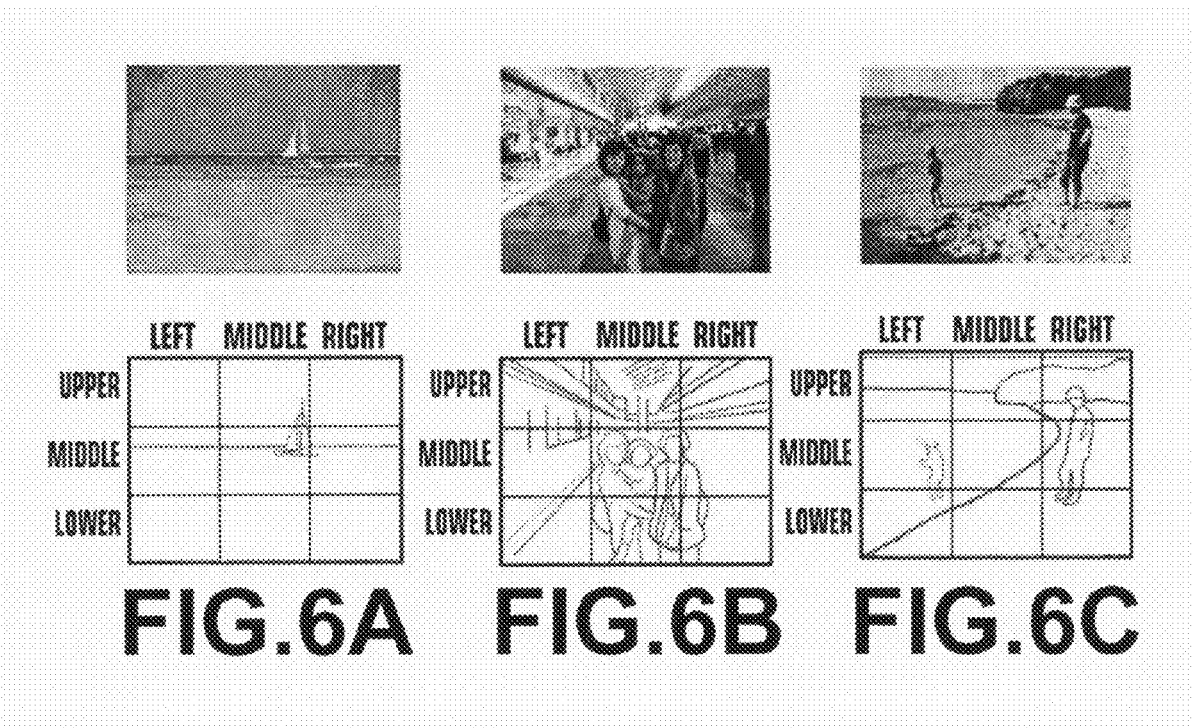

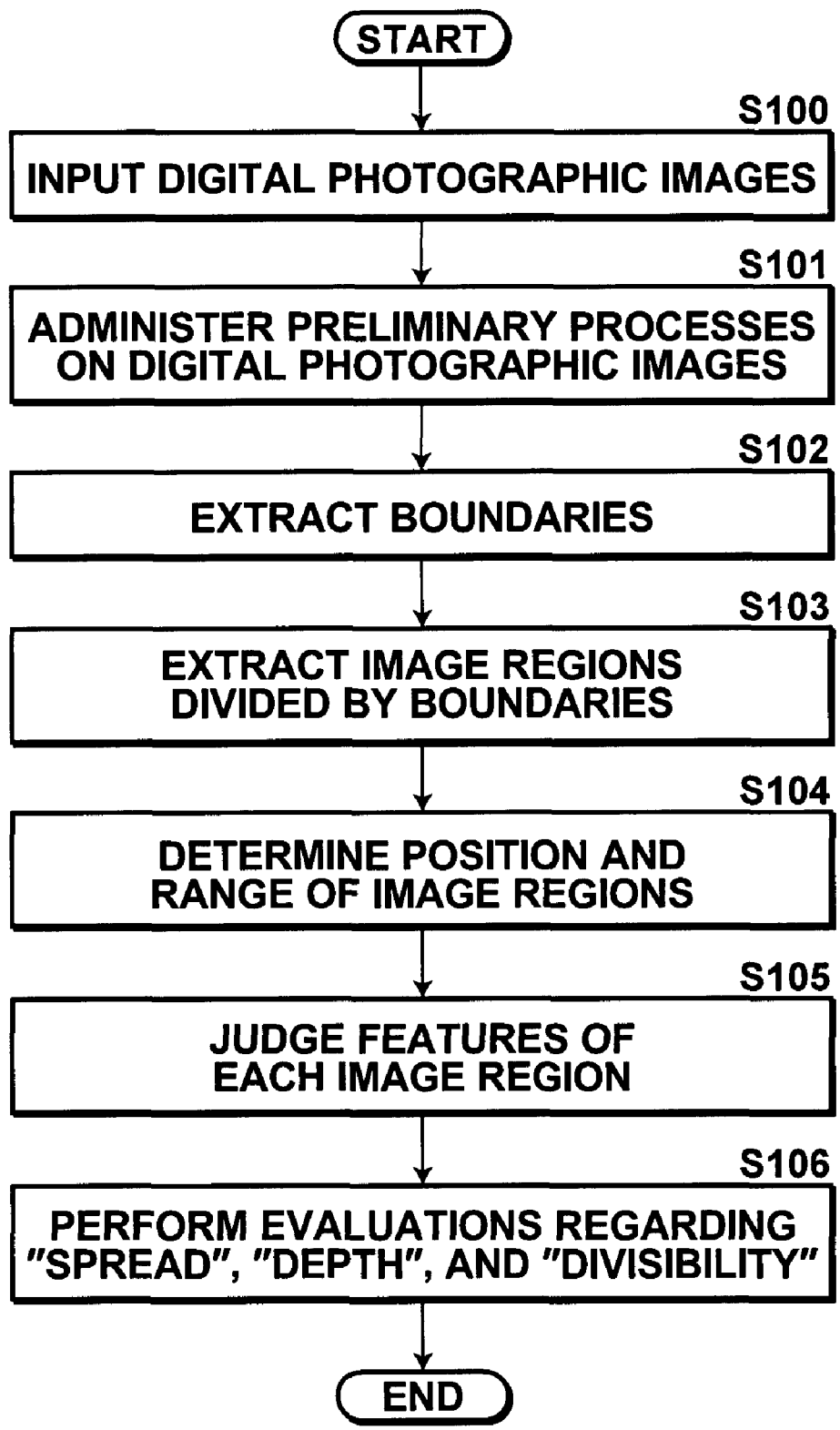

APPARATUS AND PROGRAM FOR EVALUATING IMAGES

BACKGROUND OF THE INVENTION

1. Field of the Invention

The present invention relates to an apparatus and a program for evaluating digital photographic images.

2. Description of the Related Art

Processing of subjects pictured in digital photographic images, by operators extracting the subjects, such as humans, from within displayed digital photographic images by using a mouse or the like, is being performed. However, in the case that processing is performed while tracing the subjects within the digital photographic images with a pointing device, the burden on the operators is great. In addition, the skill in tracing varies for each operator, and uniform finished cannot be obtained.

With the recent spread of digital still cameras, there is demand to administer image processes on digital images to obtain desired finishes. Administering different image processes on a pictured subject and a background, to cause the subject to stand out, is an example of such an image process. To meet this demand, systems have been proposed, in which main portions and backgrounds of images are automatically separated, and the backgrounds are blurred in order to emphasize the main portions, without an operator having to perform the troublesome task of specifying boundaries between the main portions and the backgrounds. Specifically, an image is divided into regions such that adjacent pixels having differences in data less than or equal to a threshold value are included in the same region. Then, features of each region are calculated, and whether the divided regions are background regions or main portion regions is estimated, based on the features. Thereafter, the main portion is emphasized, by blurring just the background region, or by blurring regions other than the main portion regions (refer to Japanese Unexamined Patent Publication No. 2001-057630, for example).

Other systems has been proposed, in which cells within images that include pixels having edge intensities greater than a predetermined threshold are extracted as edge cells, continuous regions which are collections of the edge cells are generated, and the cells positioned outside the periphery of the continuous regions are extracted as outline cells (refer to Japanese Unexamined Patent Publication No. 2002-236929, for example).

However, the system disclosed in Japanese Unexamined Patent Publication No. 2001-057630 judges regions outside a mask (circles or ovals having an image at its center) as background regions, and extracts the boundaries of main portions assuming that the main portions are present within the mask. Therefore, the system is not capable of dealing with varied images.

In addition, in the case that a photographic image is viewed by a human, clothes worn by subjects can easily be recognized as clothing. However, there are clothes of various textures, and therefore, edges detected by a system such as that disclosed in Japanese Unexamined Patent Publication No. 2002-236929 may include those formed by textures. Accordingly, this system cannot extract always exact outlines.

SUMMARY OF THE INVENTION

The present invention has been developed in view of the foregoing circumstances. It is an object of the present invention to provide an apparatus and a program for evaluating images, which is capable of extracting boundaries between mountains and sky, boundaries between humans and backgrounds, and the like, to evaluate photographic images in a manner close to human perception.

The image evaluating apparatus of the present invention comprises:

boundary extracting means, for extracting boundaries among a plurality of subjects which are pictured in a digital photographic image;

image region extracting means, for extracting image regions, which are divided by the extracted boundaries, from the digital photographic image;

image region position judging means, for dividing the digital photographic image into a plurality of sections, and judging which of the divided sections each of the image regions are included in;

image region feature judging means, for judging the features of each image region, by analyzing at least one of the color, texture, and shape of the image regions; and image evaluating means, for evaluating whether the digital photographic image is that which has a sense of spread, that which has a sense of depth, and whether the digital photographic image is a divisible image which can be divided into two or more parts, based on the extracted boundaries, the sections in which the image regions are included, and the features of each image region.

The program of the present invention causes a computer to function as:

boundary extracting means, for extracting boundaries among a plurality of subjects which are pictured in a digital photographic image;

image region extracting means, for extracting image regions, which are divided by the extracted boundaries, from the digital photographic image;

image region position judging means, for dividing the digital photographic image into a plurality of sections, and judging which of the divided sections each of the image regions are included in;

image region feature judging means, for judging the features of each image region, by analyzing at least one of the color, texture, and shape of the image regions; and image evaluating means, for evaluating whether the digital photographic image is that which has a sense of spread, that which has a sense of depth, and whether the digital photographic image is a divisible image which can be divided into two or more parts, based on the extracted boundaries, the sections in which the image regions are included, and the features of each image region.

Here, the term "subjects" refers to subjects of photography. The "subjects" are not limited to humans, but also include the ocean, mountains, fields, and buildings, which are backgrounds.

The term "boundaries" refers to lines that separate subjects. Examples of "boundaries" include lines that separate the ocean and the sky, lines that separate buildings and the sky, and lines that separate people and fields.

The phrase "features of image regions" refer to features of an image which are unique thereto, and are different from those of other images. For example, the "features" may be those that represent the features of the colors within the image, such as luminance, saturation, and brightness. Alternatively, the "features" may be subjects which are pictured within the image, the composition of the image, or other characteristic features.

The phrase "divisible image which can be divided into two or more parts" refers to an image which is recognized to be capable of being divided into two or more parts, based on color, brightness, or human subjects.

It is desirable for a configuration may be adopted, wherein:
the boundary extracting means comprises:
edge extracting means, for extracting edges from the digital photographic image;
reduced color image generating means, for generating a reduced color image, in which the colors of pixels having colors within a predetermined distance within a color space are replaced by a single color within the predetermined distance; and
texture distribution calculating means, for obtaining index values that represent bias of texture distribution within regions having a uniform range, based on index values that represent the bias in the distribution of each color within each region, by dividing pixels within the region that straddles the edges into groups of pixels according to color, and obtaining the index values that represent the bias in the distribution of each color; and wherein:
edges are extracted as the boundaries, if the distribution of the texture between two regions which are divided by an edge are judged not to be uniform, based on the index values that represent the biases in the texture distributions.

The phrase "index values that represent bias of texture distribution" refers to values that function as an index that represents that texture is distributed non-uniformly. The index value can be detected based on color distribution or the like.

A configuration may be adopted, wherein:
the features of the image regions to be judged by the image region feature judging means are one of: features of a region in which the sky is pictured, features of a region in which the ocean is pictured, features of a region in which plants are growing, and features of a region in which roads are pictured.

A configuration may be adopted, wherein the image evaluating means comprises:
spread evaluating means, for evaluating whether the digital photographic image has a sense of spread according to the sections which are occupied by image regions that have features of a region in which the sky is pictured or features of a region in which plants are growing, as judged by the image region feature judging means, in the case that image regions having these features are judged to be present within the digital image.

Alternatively, the image evaluating means may comprise:
depth evaluating means, for evaluating the digital photographic image to have a sense of depth, in the case that some of the boundaries extracted by the boundary extracting means extend radially.

According to the present invention, boundaries are extracted from digital photographic images, and whether the digital photographic images are those which have a sense of spread, those which have a sense of depth, and whether the digital photographic images are divisible images is evaluated, based on the positions and features of image regions divided by the boundaries. Therefore, the digital photographic images can be evaluated according to impressions approaching those obtained by humans that view the digital photographic images.

In addition, by extracting edges from the digital photographic images, and extracting edges having non uniform textures within regions that straddle the edges as the boundaries, edges caused by texture within subjects, such as the ocean, can be eliminated, and only boundaries, such as those that separate the ocean from the sky, can be extracted.

Further, evaluations that approach human judgment can be performed, by judging whether each image region has features of a region in which the sky is pictured, features of a region in which the ocean is pictured, features of a region in which plants are growing, and features of a region in which roads are pictured.

Still further, humans tend to perceive a sense of spread in the case that an image region at the upper portion of a photographic image in which the sky is pictured, or an image region in which plants growing are pictured, is large. Therefore, evaluations that approach human perception can be performed, by evaluating the sense of spread according to the size of the image region having the features of an image region in which the sky is pictured, or the features of an image region in which plants growing are pictured.

Humans tend to perceive a sense of depth when a plurality of boundaries that appear in photographic images extend radially. Therefore, evaluations that approach human perception can be performed, by evaluating that an image has a sense of depth when the boundaries therein extend radially.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object, and executable code, and can be in any language, including higher level languages, assembly language, and machine language.

BRIEF DESCRIPTION OF THE DRAWINGS

FIG. 1 is a diagram that illustrates the schematic construction of an image evaluating apparatus according to an embodiment of the present invention.

FIG. 2 is a diagram that illustrates the schematic construction of a boundary detecting means.

FIG. 3 is a diagram that illustrates the schematic construction of an evaluating means.

FIG. 6A, FIG. 6B, and FIG. 6C are diagrams for exfielding spread, depth, and divisible images.

FIG. 7 is a flow chart that illustrates the steps in the processes performed by the image evaluating apparatus.

BEST MODE FOR CARRYING OUT THE INVENTION

Figure 4A:
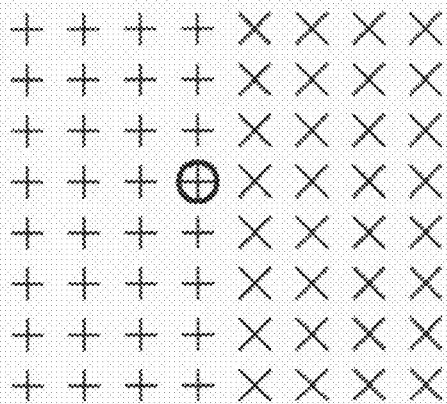
FIG. 4A and FIG. 4B are diagrams for exfielding bias in texture distribution.

Hereinafter, an embodiment of the present invention will be described with reference to the attached drawings. An image evaluating apparatus 1 according to the present embodiment of the present invention is realized by a computer (a personal computer, for example) executing an application program, which is read into an auxiliary memory device. The application program for evaluating images is distributed by being recorded on recording media, such as CD-ROM's, and the application program is installed in the computer from such a recording medium. Alternatively, the program may be distributed via a network such as the Internet, and installed in the computer via the network.

The electronic album generating apparatus 1 comprises: an image input means 10, for inputting digital photographic images 100; a boundary extracting means 20, for extracting boundaries among subjects which are pictured within the digital photographic images 100; an image region extracting means 30, for extracting image regions, which are divided by the boundaries; image region position judging means 40, for dividing the digital photographic images 100 into a plurality of sections, and judging which of the divided sections each of the image regions are included in; image region feature judging means 50, for judging the features of each image region, by analyzing at least one of the color, texture, and shape of the image regions; and image evaluating means 60, for evaluating whether the digital photographic images 100 are those that have a sense of spread, those that have a sense of depth, and whether the digital photographic images are divisible images which can be divided into two or more parts, based on the extracted boundaries, the sections in which the image regions are included, and the features of each image region.

The image input means 10 inputs the digital images 100, which are stored in memory devices, such as hard disks, or in servers connected via networks, to a work area of the image evaluating apparatus 1.

The digital photographic images 100 are digital images which are obtained by photography using digital still cameras or the like, digital images obtained by reading out photographic prints or negatives with scanners, and the like. Generally, various subjects of photography, such as the sky, fields, the ocean, people, buildings, roads, and trees, are pictured within the digital photographic images 100, and boundaries are present among the subjects. There are various types of boundaries, such as: the outline of a human body; long line segments, such as those that represent the boundaries among buildings, roads, and the surface of the ocean; and curves that represent the outlines of subjects, such as roads and shorelines.

As illustrated in FIG. 2, the boundary extracting means 20 comprises: a preliminary processing means 21, for administering preliminary processes on the digital photographic images 100; an edge extracting means 22, for extracting edges from the digital photographic images 100; reduced color image generating means 23, for generating reduced color images 120 form the digital photographic images 100; and texture distribution calculating means 24, for calculating texture distributions within the reduced color images 120. The boundary extracting means 20 extracts boundaries from the edges extracted by the edge extracting means 22.

The preliminary processing means 21 converts the digital photographic images 100 to reduced images of a predetermined size in order to accelerate processing thereof, in the case that the original sizes of the digital photographic images 100 is greater than the predetermined size. Alternatively, the preliminary processing means 21 converts the color space of the digital photographic images 100 from an RGB color space to an XYZ color space.

Figure 5A:
FIG. 5A, FIG. 5B, FIG. 5C, and FIG. 5D are diagrams for exfielding a method for extracting boundaries and image regions.
Figure 5B:
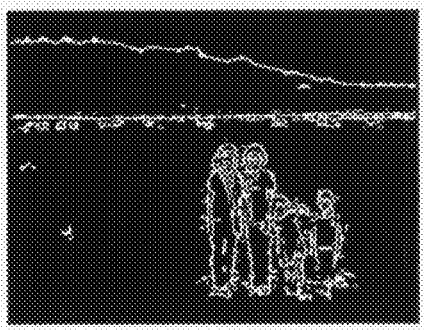

The edge extracting means 22 extracts edges from digital photographic images 110, which are the digital photographic images 100 on which preliminary processes have been administered. Specifically, the edge extracting means 22 employs a mask that obtains a gradient value for each pixel, to obtain gradient values of pixel values in six directions, at 30° intervals. In the case that the maximum gradient value among the six obtained gradient values is greater than a predetermined threshold value, it is judged that an edge exists in the direction for which the maximum gradient value was obtained. Edges are extracted, by performing this judgment for all of the pixels within the digital photographic images 110. FIG. 5A illustrates a digital photographic image 100, and FIG. 5B illustrates the edges extracted therefrom.

The reduced color image generating means 23 generates reduced color images 120, in which the colors of pixels within the digital photographic images 110 having colors within a predetermined distance within a color space are replaced by a single color. The pixels having distances therebetween which are less than the predetermined distance within the color space are grouped, and the colors thereof are replaced by a single color.

First, pixels having similar colors are grouped. Then, the center of mass of the colors of the pixels within each group is obtained within a color space. If the distances between the centers of mass are less than the predetermined distance, the groups are joined, and the center of mass of the colors of the pixels within the new group is obtained. The pixel groups are joined until there are no more groups that need to be joined. Then, the colors of the pixels within each group are replaced with the color which is at the center of mass of the group. Alternatively, the color, which is the central color of the pixels within the group may be the new color, by which the colors of the pixels therein are replaced.

The edges extracted by the edge extracting means 22 include edges which are not boundaries, such as patterns on clothing worn by humans, leaves of trees, and fine textures of fields. With regard to edges such as patterns on clothing, leaves of trees, and fine textures of fields, the same texture appears on both sides of the edges. However, with regard to an edge that separates a field and the sky, for example, the texture oftentimes differs at either side of the edge. Therefore, whether the extracted edges are boundaries is judged, by studying the textures in the vicinities thereof.

The texture distribution calculating means 24 divides pixels having the same color within a predetermined range from a selected pixel within each of the reduced color images 120. The texture distribution calculating means 24 obtains index values that represent bias of color distribution for all of the colors. Then the texture distribution calculating means 24 obtains index values that represent bias of texture distribution, based on the index values that represent bias of color distribution of the selected pixel.

Figure 4B:
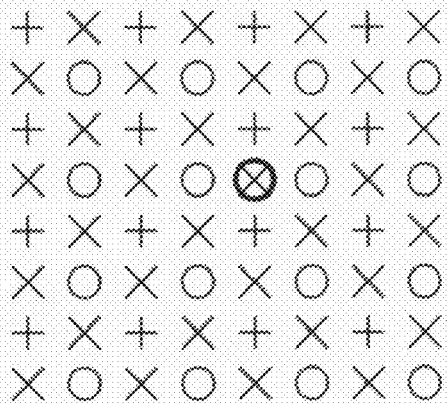

Pixels which are within a predetermined distance of a pixel within each of the reduced color images 120 are grouped according to color. The position of the center of mass is obtained for each color, that is, each group of pixels. In the case that a color is evenly distributed within a judgment region, the position of the center of mass overlaps with the position at the center of the judgment region. However, in the case that there is bias in the distribution, the position of the center of mass is shifted from the position of the center of the judgment region. Therefore, the amount of shift can be employed as the index value that represents the bias in distribution for each color. In the case that texture is evenly distributed within a judgment region, the positions of the center of mass for all colors are present within the vicinity of the center of the judgment region. However, in the case that there is bias in the distribution of texture, bias will appear in the distribution of at least one of the colors. Therefore, the mean deviation of the positions of the center of mass within a pixel group, that is, the judgment region, is designated as the index value that represents bias in texture distribution. For example, pixels of either color "+" or color "x" are present in the judgment region illustrated in FIG. 4A, and pixels of color "+", color "x", or color "o" are present in the judgment region illustrated in FIG. 4B. If the texture distribution value as defined above is calculated with respect to the pixels surrounded by the bold circle, the texture distribution value for the judgment region of FIG. 4A is 8, and the texture distribution value for the judgment region of FIG. 4B is 0. Here, a method in which texture distribution is obtained based on biases in colors has been described. However, the texture distribution may be obtained by various other known methods.

Figure 5C:
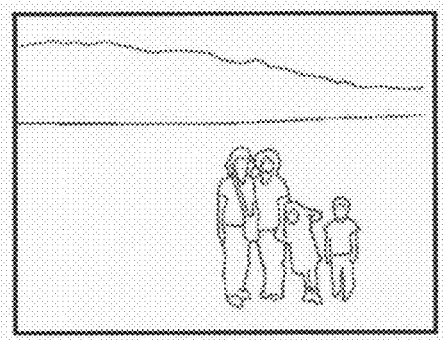

The texture distribution calculating means 24 of the boundary extracting means 20 calculates the texture distributions at the positions of pixels along the edges extracted by the edge extracting means 22. In the case that the distribution value at an edge is large, the edge is extracted as a boundary. Alternatively, the texture distributions may be obtained within judgment regions that straddle the edges, to extract the boundaries. FIG. 5C illustrates an image, in which boundaries have been extracted from the edges of FIG. 5B.

Figure 5D:

The image region extracting means 30 employs the boundaries extracted by the boundary extracting means 20 to extract image regions, each of in which it is considered that a single subject is pictured. For example, in a digital photographic image 100 in which the ocean and the sky are pictured, a boundary that separates the ocean and the sky is present. This digital photographic image 100 can be divided into an image region in which the ocean is pictured, and an image region in which the sky is pictured, based on the boundary. If all pixels other than the pixels along edges, which have been judged to be boundaries, are designated as belonging to a background region, digital photographic images 100 can be divided into a plurality of image regions according to the boundaries. Continuous image regions divided by the boundaries are extracted, employing various methods for obtaining continuous regions by graphics theory (such as the labeling process). It is presumed that a single subject is pictured within each of the continuous image regions. The image regions illustrated in FIG. 5D, which are filled with different colors, represent image regions divided by the boundaries of FIG. 5C and extracted from a digital photographic image 100.

The image region position judging means 40 divides the digital photographic images 100 into a plurality of sections. The position and size of each image region are determined, by judging which of the divided sections each of the image regions are included in. For example, a mask constituted by nine frames, formed by three equidistant horizontal lines that separate an image into an upper, middle, and lower portion, and three equidistant vertical lines that separate the image into a left, middle, and right portion is placed over the digital photographic images 100, as illustrated in FIGS. 6A, 6B, and 6C. Which of the sections the image regions extracted by the image region extracting means 30 are included in is judged. In addition, the positional range of each image region is expressed in a two dimensional area, by employing indices that represent the vertical (upper, middle, lower) and horizontal (left, middle, right) positions. In the case that an image region is present in a plurality of sections, the ratio of each of the sections occupied by the image region is obtained, and if the ratio is less than a predetermined ratio, the image region is treated as though it is not present within that section.

The image region feature judging means 50 analyzes the color, texture, and shape of each image region, and judges whether the image region has the features of the sky, the ocean, plants, artificial constructs, or the like. The image features of the image regions extracted by the image region extracting means 30 are judged by the colors within the image regions, the shape of the image regions, and the textures within the image regions. Examples of characteristic colors are: sky blue, ocean blue, green that represents plants and forests, black that represents roads, red and yellow that represent flowers. Examples of characteristic shapes are: line segments that represent the outline of a building, and pairs of long line segments (boundaries) that represent roads. Further, characteristic textures include uniform textures, such as that present in regions such as gardens, in which plants and flowers are growing. These features may be employed to estimate the subjects which are pictured in each of the image regions.

As illustrated in FIG. 3, the image evaluating means 60 comprises: a spread evaluating means 61, for evaluating the sense of spread of the digital photographic images 100; a depth evaluating means 62, for evaluating the sense of depth of the digital photographic images 100; and a divisible image evaluating means 63, for evaluating whether the digital photographic images 100 are images that can be divided by colors, brightness or human subjects. The evaluations are performed employing data obtained by the boundary extracting means 20, the image region position judging means 40, and the image region feature judging means 50. Specifically, the images are evaluated according to the following rules.

If a large image region is distributed in the upper and middle portions, or the middle and lower portions of a photographic image 100, in the vertical direction; the image region is included in at least two sections in the horizontal direction, and the image region features are those of the sky, or places where plants grow, such as mountains or fields, it is judged that the image has the horizon pictured therein. In this case, the spread evaluating means 61 evaluates the digital photographic image 100 as being an image having a sense of spread. The image of FIG. 6A would be evaluated as being an image having a sense of spread, for example.

If lines within a digital photographic image 100 intersect in a radial manner, or if lines within a digital photographic image 100 converge at the center of a horizontally extending line, the depth evaluating means 62 evaluates the digital photographic image 100 as being an image having a sense of depth. The image of FIG. 6B has radially intersecting lines therein, and would be evaluated as being an image having a sense of depth.

If the difference in brightness between the middle portion and the left and right portions of a digital photographic image 100 is great, and image regions are divided into those that have bright features and those that have dark features; or if the number of image regions is low, and there are other characteristics, such as the manner in which a plurality of lines intersect, or a polygonal shape in the boundaries between the image regions, the divisible image evaluating means 63 evaluates the digital photographic image 100 as being a divisible image. The image of FIG. 6C is a divisible image, divisible into three main regions, each picturing the ocean, the sky, and a mountain.

Hereinafter, the method by which digital photographic images are evaluated by the image evaluating apparatus 1 will be described with reference to the flow chart of FIG. 7.

First, digital photographic images 100 to be evaluated are input from the image input means 10 (step S100). The preliminary processes are administered on the input digital photographic images 100 by the preliminary processing means 21. Boundaries are extracted from the digital photographic images 110, on which the preliminary processes have been administered, by the boundary extracting means 20 (step S102).

The image region extracting means 30 obtains image regions, which are divided by the extracted boundaries (step s103). The image regions are divided such that each image region includes a single subject. For example, the image of FIG. 5A is divided into four image regions, each including a mountain, the sky, a field, and human subjects. The position and range of each image region are determined by the image region position judging means 40 (step S104). The positions and ranges of the image regions are determined by judging which of the nine sections the image regions are included in. Further, the image feature judging means 50 judges whether the image region has the features of the sky, the ocean, plants, artificial constructs, or the like (step S105).

The evaluating means 60 performs evaluations regarding the sense of spread, the sense of depth, and the divisibility of the digital photographic images 100, employing the spread evaluating means 61, the depth evaluating means 62, and the divisible image evaluating means 63 (step S106). The evaluations are performed based on data obtained by the boundary extracting means 20, the image region position judging means 40, and the image region feature judging means 50. The obtained evaluation values are recorded as evaluations for the digital photographic images 100.

As described in detail above, boundaries are extracted from digital photographic images, and whether the digital photographic images are those which have a sense of spread, those which have a sense of depth, and whether the digital photographic images are divisible images is evaluated, based on the positions and features of image regions divided by the boundaries. Therefore, the digital photographic images can be evaluated according to impressions approaching those obtained by humans that view the digital photographic images.

What is claimed is:

1. An image evaluating apparatus, comprising:
   boundary extracting means, for extracting boundaries among a plurality of subjects which are pictured in a digital photographic image;
   image region extracting means, for extracting image regions, which are divided by the extracted boundaries, from the digital photographic image;
   image region position judging means, for dividing the digital photographic image into a plurality of sections, and judging which of the divided sections each of the image regions are included in;
   image region feature judging means, for judging the features of each image region, by analyzing at least one of the color, texture, and shape of the image regions; and
   image evaluating means, for evaluating whether the digital photographic image is that which has a sense of spread, that which has a sense of depth, and whether the digital photographic image is a divisible image which can be divided into two or more parts, based on the extracted boundaries, the sections in which the image regions are included, and the features of each image region, wherein:
   the boundary extracting means comprises:
   edge extracting means, for extracting edges from the digital photographic image;
   reduced color image generating means, for generating a reduced color image, in which the colors of pixels having colors within a predetermined distance from a reference color within a color space are replaced by a single color within the predetermined distance; and
   texture distribution calculating means, for obtaining index values that represent bias of texture distribution within judgment regions of the reduced color image having a uniform range, based on index values that represent the bias in the distribution of each color within each judgment region, by dividing pixels within each judgment region, which straddles an edge of the extracted edges, into groups of pixels according to color, and obtaining the index values that represent the bias in the distribution of each color; and wherein:
   edges are extracted as the boundaries, if the distribution of the texture within the judgment regions are judged not to be uniform between two sides of the judgment regions which are divided by the edges, based on the index values that represent the biases in the texture distributions.

2. An image evaluating apparatus as defined in claim 1, wherein:
   the features of the image regions to be judged by the image region feature judging means are one of: features of a region in which the sky is pictured, features of a region in which the ocean is pictured, features of a region in which plants are growing, and features of a region in which roads are pictured.

3. An image evaluating apparatus as defined in claim 2, wherein the image evaluating means comprises:
   spread evaluating means, for evaluating whether the digital photographic image has a sense of spread according to the sections which are occupied by image regions that have features of a region in which the sky is pictured or features of a region in which plants are growing, as judged by the image region feature judging means, in the case that image regions having these features are judged to be present within the digital image.

4. An image evaluating apparatus as defined in claim 1, wherein the image evaluating means comprises:
   depth evaluating means, for evaluating the digital photographic image to have a sense of depth, in the case that some of the boundaries extracted by the boundary extracting means extend radially.

5. A non-transitory computer readable medium having a program stored therein, the program causing a computer to function as:
   boundary extracting means, for extracting boundaries among a plurality of subjects which are pictured in a digital photographic image;
   image region extracting means, for extracting image regions, which are divided by the extracted boundaries, from the digital photographic image;
   image region position judging means, for dividing the digital photographic image into a plurality of sections, and judging which of the divided sections each of the image regions are included in;
   image region feature judging means, for judging the features of each image region, by analyzing at least one of the color, texture, and shape of the image regions; and
   image evaluating means, for evaluating whether the digital photographic image is that which has a sense of spread, that which has a sense of depth, and whether the digital photographic image is a divisible image which can be divided into two or more parts, based on the extracted boundaries, the sections in which the image regions are included, and the features of each image region, wherein:
   the boundary extracting means comprises:
   edge extracting means, for extracting edges from the digital photographic image;
   reduced color image generating means, for generating a reduced color image, in which the colors of pixels having colors within a predetermined distance from a reference color within a color space are replaced by a single color within the predetermined distance; and
   texture distribution calculating means, for obtaining index values that represent bias of texture distribution within judgment regions of the reduced color image having a uniform range, based on index values that represent the bias in the distribution of each color within each judgment region, by dividing pixels within each judgment region, which straddles an edge of the extracted edges, into groups of pixels according to color, and obtaining the index values that represent the bias in the distribution of each color; and wherein:

edges are extracted as the boundaries, if the distribution of the texture within the judgment regions are judged not to be uniform between two sides of the judgment regions which are divided by the edges, based on the index values that represent the biases in the texture distributions.

6. An image evaluating apparatus, comprising:

boundary extracting means, for extracting boundaries among a plurality of subjects which are pictured in a digital photographic image;

image region extracting means, for extracting image regions, which are divided by the extracted boundaries, from the digital photographic image;

image region position judging means, for dividing the digital photographic image into a plurality of sections, and judging which of the divided sections each of the image regions are included in;

image region feature judging means, for judging the features of each image region, by analyzing at least one of the color, texture, and shape of the image regions; and image evaluating means, for evaluating whether the digital photographic image is that which has a sense of spread, that which has a sense of depth, and whether the digital photographic image is a divisible image which can be divided into two or more parts, based on the extracted boundaries, the sections in which the image regions are included, and the features of each image region, wherein:

the features of the image regions to be judged by the image region feature judging means are one of: features of a region in which the sky is pictured, features of a region in which the ocean is pictured, and features of a region in which plants are growing, and wherein the image evaluating means comprises:

spread evaluating means, for evaluating whether the digital photographic image has a sense of spread according to the sections which are occupied by image regions that have features of a region in which the sky is pictured or features of a region in which plants are growing, respectively, as judged by the image region feature judging means, in the case that image regions having these features are judged to be present within the digital image, wherein the digital photographic image is divided into three sections in the vertical direction and three sections in the horizontal direction, to define nine sections, and the digital photographic image is evaluated to be an image having a sense of spread in the case that the image regions having these features are present across the middle and upper sections in the vertical direction or present across the middle and lower sections in the vertical direction, and the image regions having these features are present within at least two of the left section, the middle section and the right section in the horizontal direction.

* * * * *